United States Patent [19]
Johnson

[11] 3,799,060
[45] Mar. 26, 1974

[54] HIGH SPEED PASSENGER CONVEYOR

[75] Inventor: Ernest D. Johnson, Tallmadge, Ohio

[73] Assignee: The Goodyear Tire & Rubber Company, Akron, Ohio

[22] Filed: June 4, 1971

[21] Appl. No.: 150,049

[52] U.S. Cl.................. 104/18, 104/135, 198/110, 198/162
[51] Int. Cl............................................ B65g 23/32
[58] Field of Search........... 104/18, 19, 20, 25, 134, 104/135, 147, 162, 165, 168; 198/76, 110, 165, 185, 201

[56] References Cited
UNITED STATES PATENTS

| | | | |
|---|---|---|---|
| 2,905,100 | 9/1959 | Kendall................................. | 104/20 |
| 2,947,263 | 8/1960 | Vidmar.................................. | 104/168 |
| 3,592,140 | 7/1971 | Zuppiger............................... | 104/25 |
| 3,583,325 | 6/1971 | Melin..................................... | 104/25 |
| 3,395,784 | 8/1968 | Kanarek................................ | 198/165 |
| 3,521,322 | 7/1970 | Michael................................. | 17/55 |

FOREIGN PATENTS OR APPLICATIONS

| | | | |
|---|---|---|---|
| 828,151 | 5/1938 | France.................................. | 104/18 |

*Primary Examiner*—Gerald M. Forlenza
*Assistant Examiner*—D. W. Keen
*Attorney, Agent, or Firm*—F. W. Brunner; R. P. Yaist; Frederick K. Lacher

[57] ABSTRACT

A passenger conveyor having a movable passenger supporting surface for continuously carrying passengers from a low speed boarding area to a high speed zone and then to a low speed unloading area in which the passenger retaining sides of the conveyor in the high speed zone are propelled at the same high speed as the passenger supporting surface to protect the passengers from being injured by impact with stationary or slow moving objects. Spacing members extend transversely of the conveyor and are propelled at the same speed as the supporting surface to prevent crowding of the passengers at the deceleration end of the conveyor and also provide handles for the passengers during acceleration, deceleration and high speed movement along the conveyor. The spacing members may be carried by the moving sides of the balustrades or by platforms having open sides for entering and leaving the conveyor in the low speed areas. The platforms are supported by belts, rollers or on rails and are driven by the rollers or by belts engaging the platforms. Acceleration and deceleration is provided by rollers driven at progressively different speeds or by a series of belts moving at progressively different speeds.

19 Claims, 20 Drawing Figures

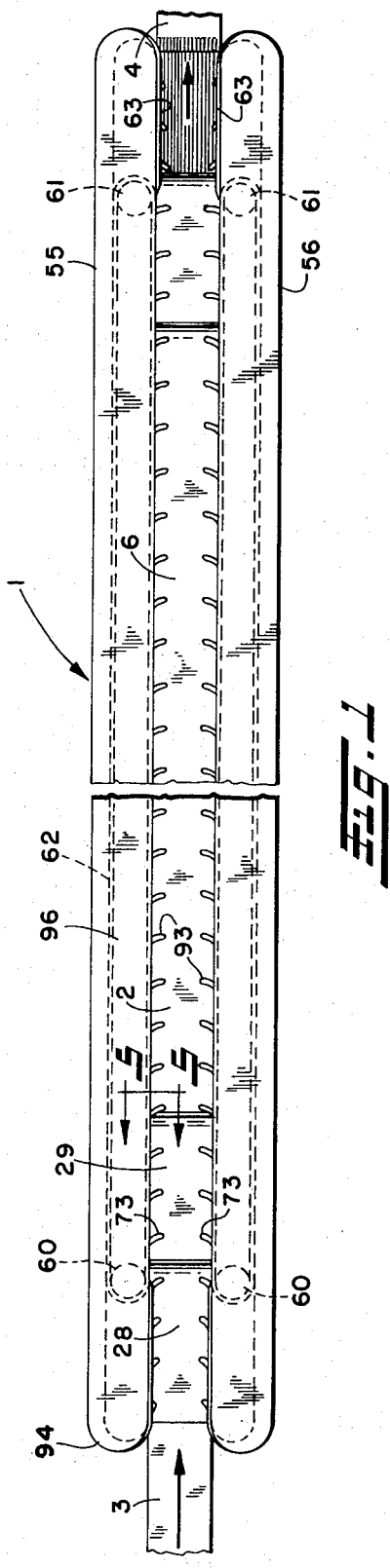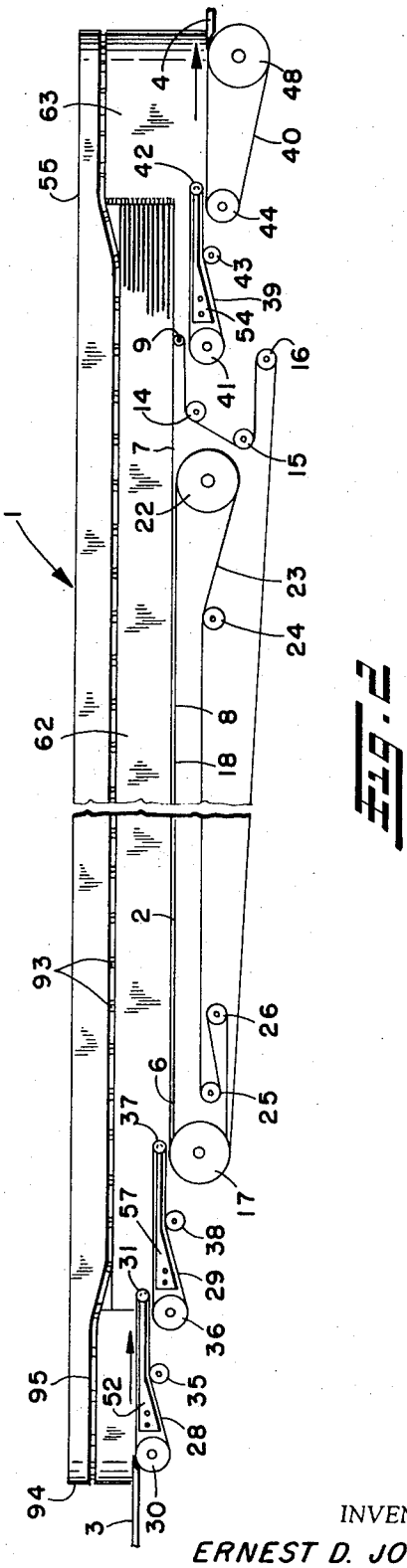

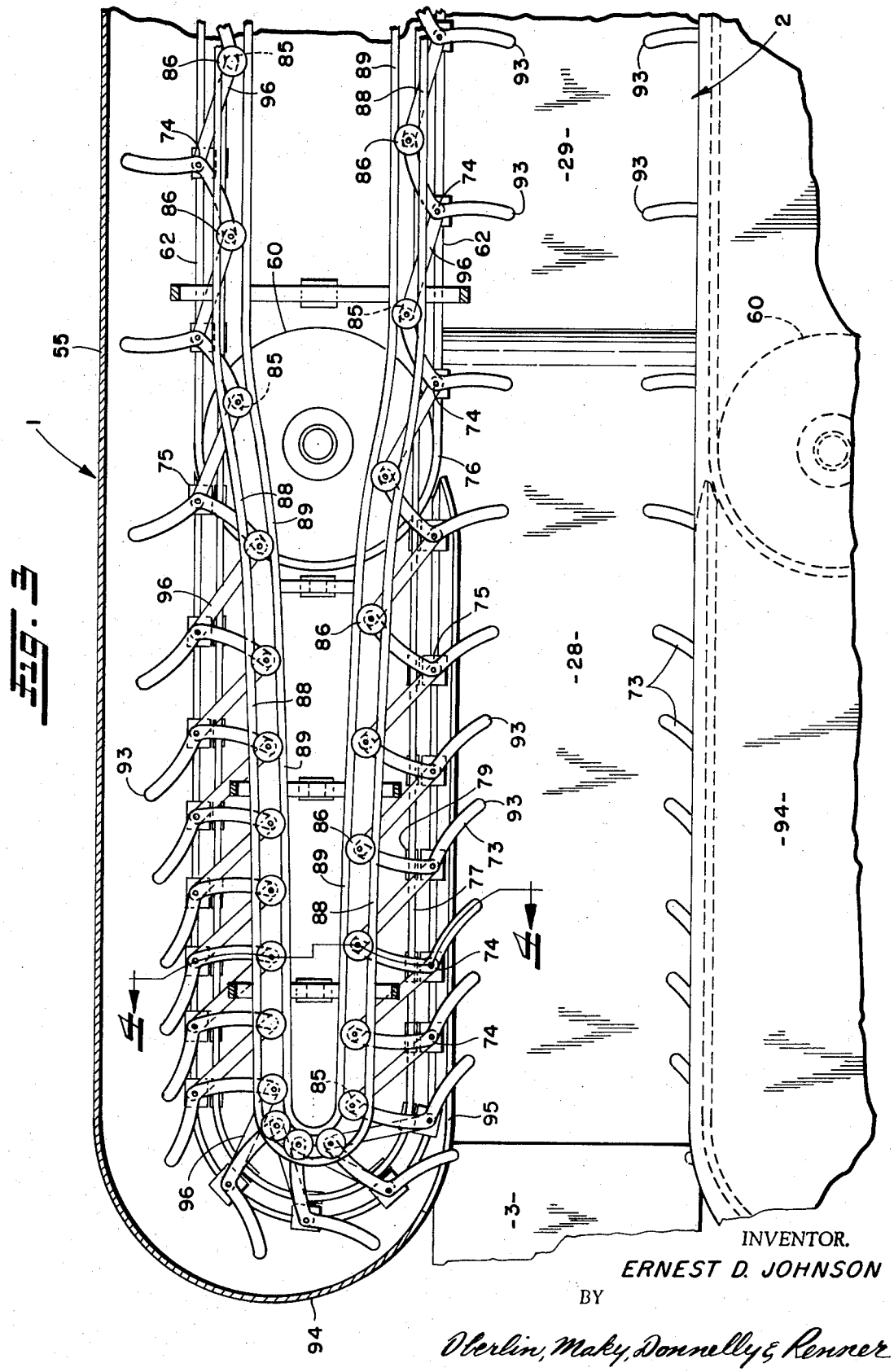

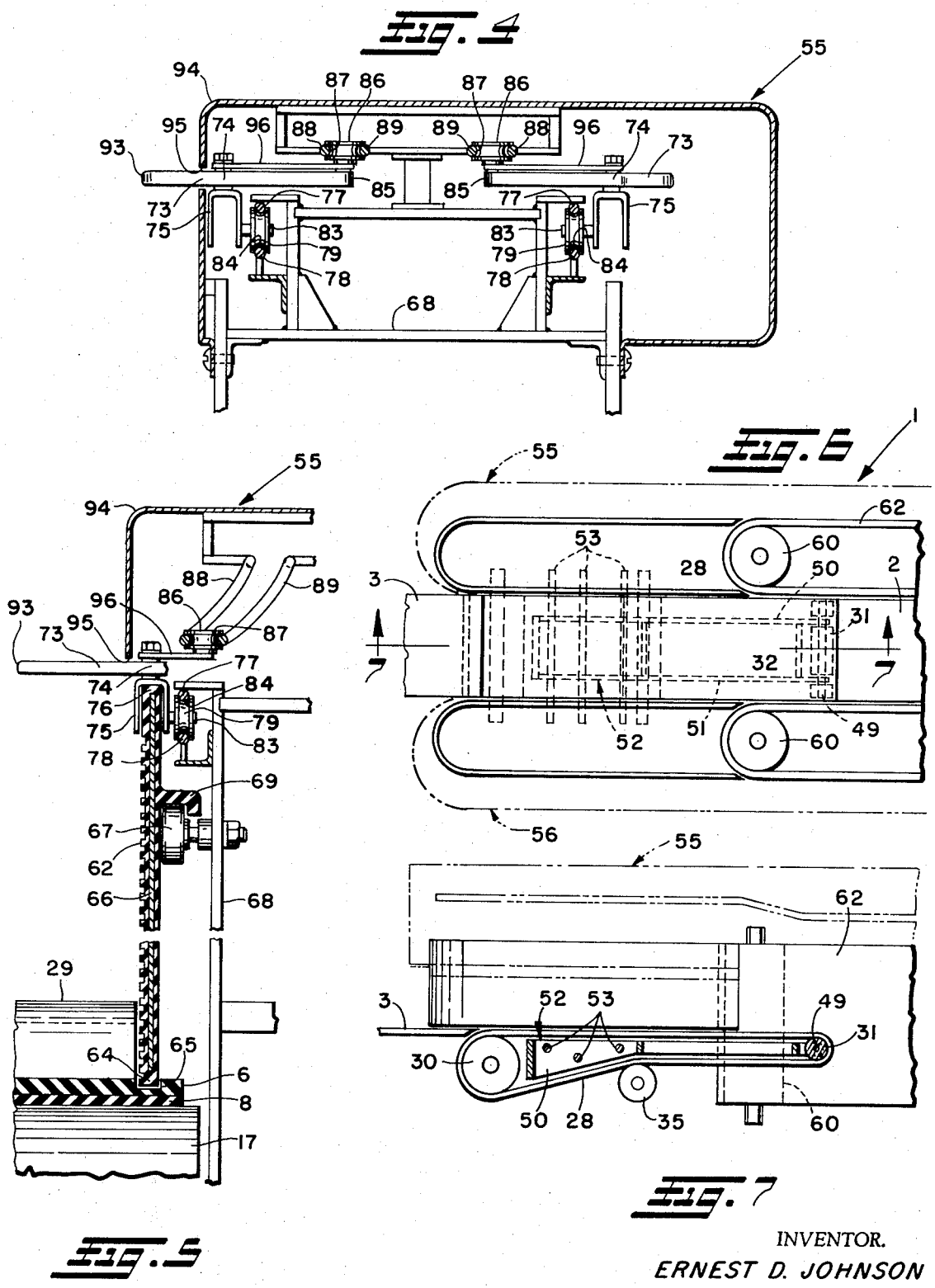

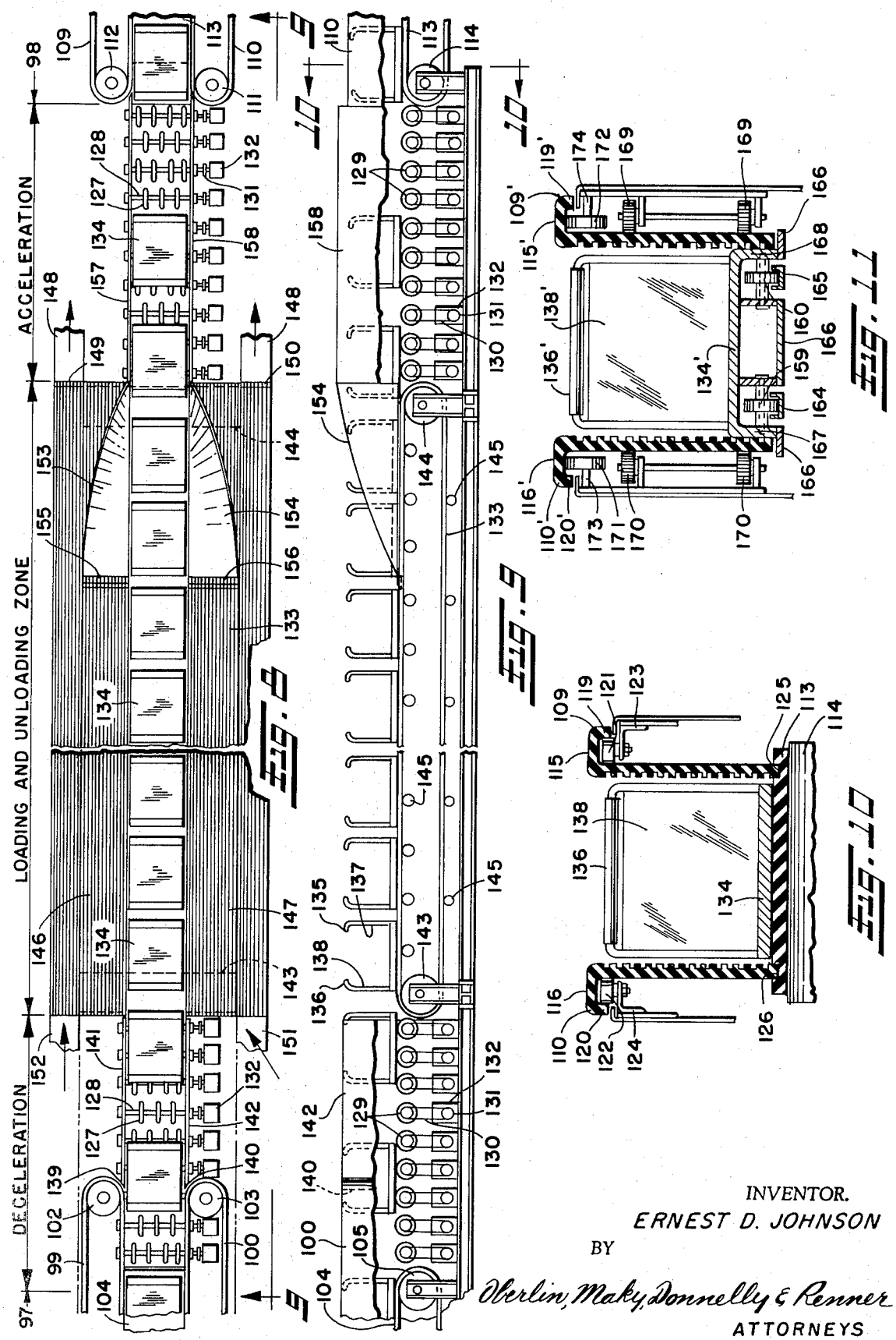

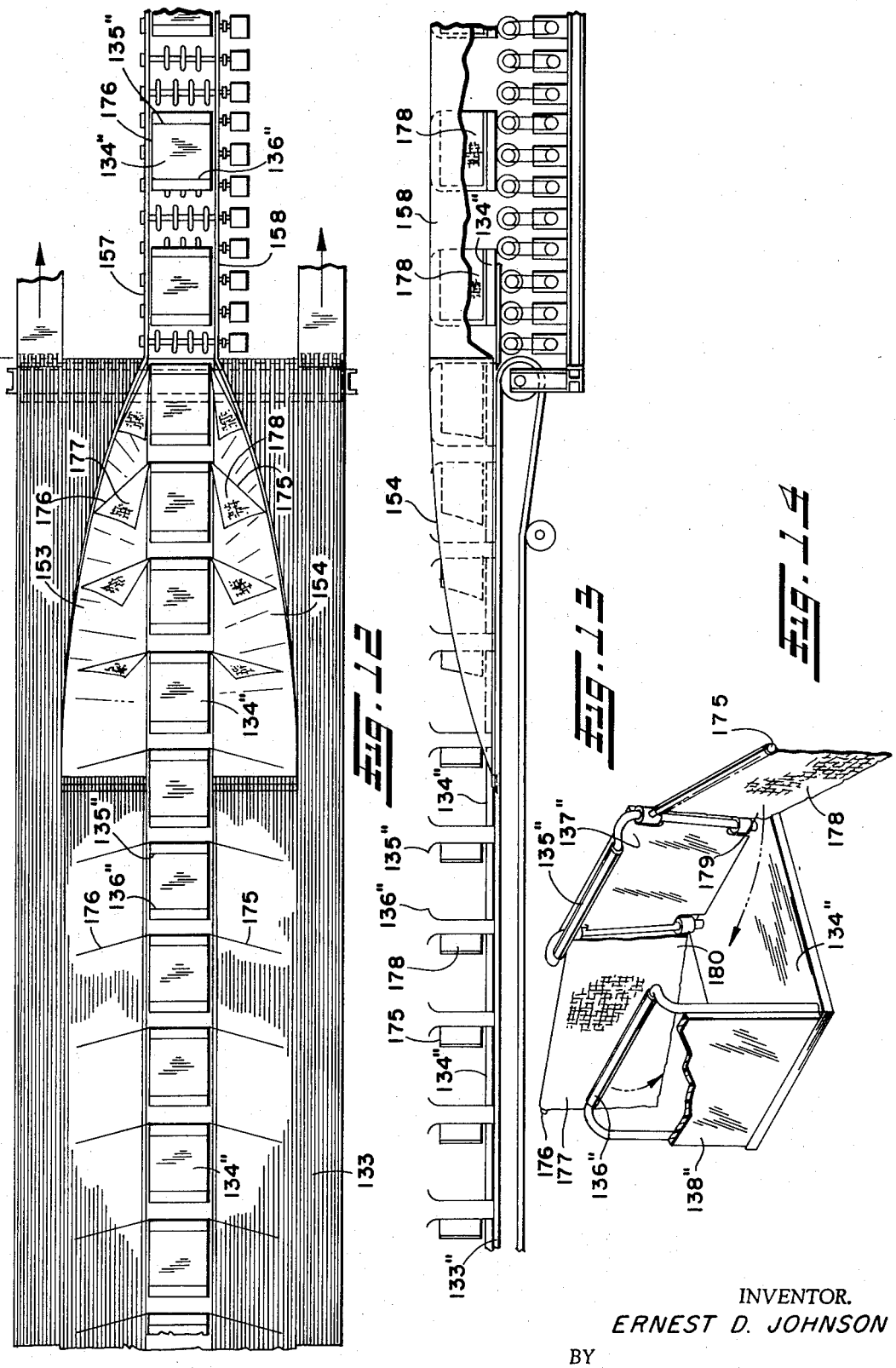

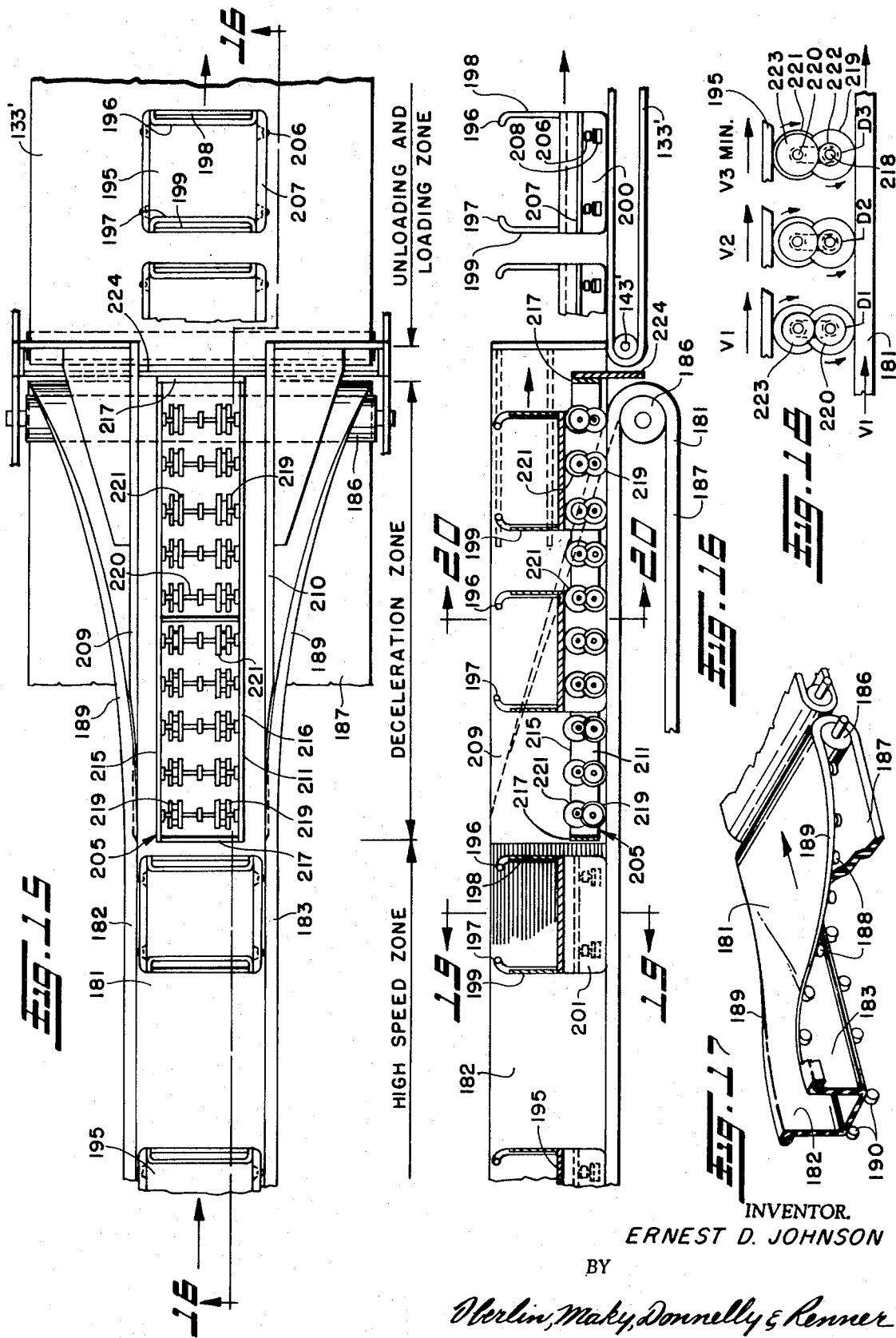

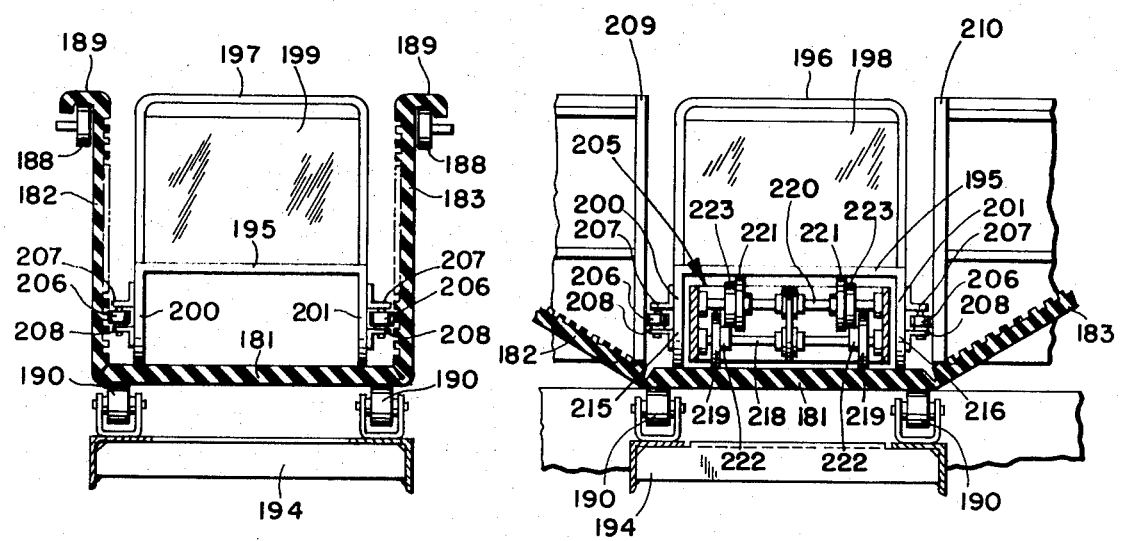

HIGH SPEED PASSENGER CONVEYOR

This invention relates generally to high speed passenger conveyor systems and more particularly to the passenger retaining sidewalls and the passenger controlling and supporting handles which are movable at the same high speed as the passenger supporting surfaces.

In conveying passengers on a moving surface at speeds of one and one-half miles per hour or less, handrails moving at the same speed as the moving surface are provided and, if during operation the passengers come in contact with a trim plate or walls of the stationary balustrade, no serious problems have been experienced because of the low speed at which the passengers are traveling. As the speed of the passenger carrying surface is increased, the possibility of injury or loss of balance due to contact of a passenger with a stationary part of the balustrade is also increased and there is a definite need at these speeds to eliminate this possibility of contact with the balustrade.

Systems have been devised for conveying passengers at a higher speed and an example of one type of system is shown in U. S. Pat. No. 2,756,686 of M. A. Kendall et al. for Transportation Apparatus and U. S. Pat. No. 2,905,100 of M. A. Kendall et al. for System of Passenger Transportation. The system shown in these patents utilizes a low speed conveyor on which passengers can walk from a stationary sidewalk to slow moving cabs where the passengers are seated. These cabs are then accelerated from the low speed to a higher speed where they are carried on a high speed conveyor and thereafter are decelerated and again carried on a low speed conveyor next to a low speed sidewalk conveyor onto which the passengers can step and then walk off onto a stationary sidewalk. This system is satisfactory for applications where it is possible to carry seated passengers in an enclosed cab from the entry point to their destination. In a system such as a belt type conveyor, however, the passengers are not in an enclosed cab but are standing on the conveyor between balustrade walls and can come in contact with a stationary balustrade wall which may cause them to lose their balance or sustain an injury if the speed of the conveyor is substantially more than 1½ miles per hour.

It has been found that passengers tend to walk toward the forward end of a belt type conveyor rather than stand in one place and this is especially true of long conveyors. In a high speed conveyor, it is important that the passengers be distributed along the conveyor and not concentrated in the forward area because such concentration or flooding of the deceleration area of the conveyor results in dangerous crowding especially when the passengers are attempting to step off the conveyor at a desired station.

Where the conveyor is transporting passengers on a moving surface, a hand hold moving at the same speed as the surface is desirable and for low speed conveyors conventional handrails have been satisfactory. It has been found, however, that where there is acceleration, deceleration and high speed zones in a conveyor system, the conventional handrail is not adequate and an improved handle propelling apparatus is needed.

Other problems have been encountered at the loading area of a passenger conveying system where the passengers must be directed from a moving sidewalk onto the passenger carrying surface in the acceleration area of the conveyor.

It has also been found that where belts are used, a continuous conveyor apparatus is required to return the belts to the point where they are operative for carrying or retaining the passengers on a conveyor and the design of the return apparatus is restricted by space, appearance and cost limitations. This is especially true in a high speed conveyor where more belts are utilized which increases the problems over those found in a single belt, one speed passenger conveyor system.

With the foregoing in mind, it a principal object of this invention to provide a high speed conveyor in which the passenger retaining sides are propelled at the same speed as the passengers in the high speed section of the conveyor to protect the passengers from injury.

Another object of this invention is to provide a balustrade wall which will move at substantially the same speed as the conveyor in the high speed section of the conveyor.

A further object is to provide a moving balustrade wall which is flexible in the longitudinal direction and has substantial stiffness in the transverse direction for supporting the wall.

A still further object of this invention is to provide transverse spacing members along the length of the conveyor to prevent overcrowding at the deceleration area of the conveyor.

Another object of the invention is to provide handles on the spacing members for supporting and controlling the movement of passengers.

An additional object of the invention is to provide for accelerating and decelerating the handles in the acceleration and deceleration areas of the conveyor.

Still another object of this invention is to provide a series of transporting belts at the acceleration and deceleration areas of the conveyor so that the passengers may step down to a belt traveling at a different speed and thereby progressively decelerate or accelerate their movements.

A further object is to provide passenger carrying platforms having spacing handles at the ends.

A still further object is to provide swinging side panels on the passenger carrying platforms for permitting entrance and exit of the passengers at the unloading and loading areas and protection of the passengers in the high speed zone of the conveyor.

Another object is to provide a sloped balustrade section at the entrance to the acceleration section of the conveyor for urging passengers inward onto the conveyor and for swinging the side panels to the closed positions.

A further object is to provide balustrade walls which are hinged to the high speed belt and fold down at the exit end of the conveyor for movement over a single return pulley for the belt and walls.

An additional object of the invention is to provide acceleration and deceleration roller frames with pairs of rollers driven by a supporting belt and producing variable speeds to propel passenger carrying platforms in these areas.

Another object is to provide landing belts for carrying the passenger carrying platforms and presenting a surface on which the passengers may walk during loading and unloading.

Still another object is to provide an acceleration and deceleration apparatus having rollers driven by resilient belts to compensate for simultaneous engagement of the passenger carrying platform with rollers being driven by drive pulleys rotating at different speeds.

A further object of this invention is to provide a grooved balustrade surface for engagement with comb members at the ends of the conveyor between the stationary balustrade and moving balustrade walls.

An additional object of this invention is to provide moving balustrade walls in driving engagement with a passenger carrying platform supported by wheel on stationary rails in the high speed zone of the conveyor.

These and other objects of the present invention may be achieved by a passenger conveyor system in which the balustrade or side walls of the conveyor are propelled at the same high speed as the passenger supporting surface in the high speed zone of the conveyor and handles are provided extending transversely of the conveyor for spacing the passengers and providing them with the necessary support. The moving balustrade walls may be separate from the passenger conveying surface and returned around vertical pulleys or they may be hinged to the passenger carrying surface and folded down into a horizontal position at the end of the conveyor for movement around a horizontal return pulley with the passenger carrying belt surface. The moving balustrade walls may be utilized to carry the spacing and supporting handles and also may be used to drive a passenger carrying platform. Acceleration and deceleration of the passengers is provided through a series of belts traveling at different speeds or through rollers driven at progressively different speeds for propelling passenger carrying platforms.

To the accomplishment of the foregoing and related ends, the invention, then, comprises the features hereinafter fully described and particularly pointed out in the claims, the following description and the annexed drawings setting forth in detail a certain illustrative embodiment of the invention and modifications thereof, these being indicative, however, of but several of the various ways in which the principles of the invention may be employed.

In the annexed drawings:

FIG. 1 is a schematic plan view of a high speed passenger conveyor system constructed in accordance with this invention;

FIG. 2 is a side elevation of the high speed conveyor system shown in FIG. 1;

FIG. 3 is an enlarged fragmentary top plan view of the head end of the conveyor shown in FIG. 1 with parts being broken away to show the handles and linkage for extending and accelerating the handles;

FIG. 4 is a fragmentary sectional view taken along the plane of line 4—4 of FIG. 3;

FIG. 5 is a fragmentary sectional view taken along the plane of line 5—5 of FIG. 1 showing the handles and moving balustrade wall;

FIG. 6 is a schematic top plan view of the head end of the conveyor shown in FIG. 1 with the mechanism for driving and supporting the first accelerating belt being shown in dotted lines;

FIG. 7 is a sectional view taken along the the plane of line 7—7 in FIG. 6 showing the first accelerating belt in greater detail;

FIG. 8 is a schematic top plan view of a modification of the invention showing passenger carrying platforms at different sections of the conveyor;

FIG. 9 is a side elevational view taken along the plane of line 9—9 of FIG. 8, parts being broken away to show the engagement of the driving rollers and the belt with the passenger carrying platform;

FIG. 10 is an enlarged sectional view taken along the plane of line 10—10 of FIG. 9 with parts being broken away;

FIG. 11 is a sectional view like FIG. 10 showing a modified construction in which the passenger carrying platform is propelled by the moving balustrade walls;

FIG. 12 is a schematic top plan view of a passenger conveyor system embodying the invention showing a modified form of passenger carrying platform in the unloading and loading zone and in the acceleration area;

FIG. 13 is a side elevational view of the conveyor shown in FIG. 12 with parts being broken away;

FIG. 14 is an enlarged perspective view of the passenger carrying platform of FIG. 12 showing the swinging side panels;

FIG. 15 is a schematic top plan view of another modification of the invention showing the passenger carrying platforms on the conveyor in the deceleration area, high speed and unloading and loading area, parts being broken away;

FIG. 16 is a fragmentary side elevational view in section taken along the plane of line 16—16 of FIG. 15;

FIG. 17 is a schematic view in perspective of the hinged sidewall and passenger carrying belt showing the unfolding of the belt at the deceleration area and the movement of the sidewalls and support portion over the horizontal pulley at the end of the deceleration area, parts being broken away;

FIG. 18 is an enlarged schematic view of the rollers shown in FIG. 16 illustrating the relative rotation and propelling velocities at different positions of the deceleration zone;

FIG. 19 is an enlarged section view of the construction shown in FIGS. 15 and 16 taken along the plane of line 19—19 of FIG. 16;

FIG. 20 is a view like FIG. 19 taken along the plane of line 20—20 in FIG. 16, parts being broken away.

Referring now in detail to the drawings and first, especially to FIGS. 1 and 2, there is shown a conveyor system 1 which includes a movable walkway 2 extending from a stationary platform 3 at the entrance end to a stationary platform 4 at the exit end. The movable walkway has a high speed zone in which the passengers are supported on a high speed belt 6 having an upper run 7 supported by an auxiliary driving belt 8 over most of its length. At the exit end of the high speed zone, high speed belt 6 extends around an idler pulley 9. A lower return run 13 of the high speed belt 6 extends from the idler pulley 9 around additional idler pulleys 14, 15 and 16 and then towards the entrance end of the movable walkway 2 where there is overlapping engagement of the high speed belt 6 with the auxiliary driving belt 8 around a main driving pulley 17. The auxiliary driving belt 8 has an upper run 18 extending from the driving pulley 17 towards the exit end and around an idler pulley 22 which is spaced from the idler pulley 9 of the high speed belt. A return run 23 of the auxiliary driving belt 8 extends from the idler pulley 22 towards the entrance end and may pass over another idler pulley 24 and over take-up pulleys 25 and 26 before reaching the main driving pulley 17.

Between the stationary platform 3 and the high speed zone, the movable walkway 2 has a first accelerating belt walkway 28 and a second accelerating belt walkway 29 disposed in tiers so that passengers step from one to the other to progressively increase their speed before stepping onto the high speed belt 6 in the high speed zone. The first accelerating belt walkway 28 which is adjacent the stationary platform 3 at the entrance end has a drive pulley 30 towards the entrance end and an idler pulley 31 extending over the adjacent end of the second accelerating belt walkway 29 so that a passenger on the first walkway can step down onto the second belt walkway. The idler pulley 31 has a small diameter and a second idler pulley 35 engaging the return run of the belt walkway 28, holds it out of contact with the second belt walkway 29 and provides a construction with a small step from the first belt walkway to the second belt walkway. Preferably, the first accelerating belt walkway 28 is propelled at a speed of approximately 1½ miles per hour. This construction is shown in more detail in FIG. 7.

The second accelerating belt walkway 29 also has a drive pulley 36 located under the idler pulley 31 of the first belt walkway 28 and an idler pulley 37 of relatively small diameter extending over the high speed belt 6 at the main driving pulley 17 so that passengers have a small step from the second accelerating belt walkway onto the high speed belt 6. An idler pulley 38 of the second accelerating belt walkway 29 engages the return run and holds it out of contact with the high speed belt 6. Preferably, the second accelerating belt walkway 29 is propelled at a speed of approximately three miles per hour so that passengers stepping from the first accelerating belt walkway 28 onto the second accelerating belt walkway can do so without losing their balance. The speed transition from the second belt walkway 29 to the high speed belt 6 is also of the same magnitude and preferably the high speed belt is propelled at a speed of 4½ miles per hour.

Deceleration is provided between the high speed zone and the stationary platform 4 at the exit end of the moving walkway 2 by a first decelerating belt walkway 39 and a second decelerating belt walkway 40 disposed in tiers. The first decelerating belt walkway 39 has a drive pulley 41 located below the idler pulley 9 of the high speed belt 6 so that passengers may step from the high speed belt to the first decelerating belt walkway which is preferably propelled at a speed of 3 miles per hour. The first decelerating belt walkway 39 extends toward the exit end of the walkway 2 and over a small diameter idler pulley 42 located above the second decelerating belt walkway 40 so that passengers have a small step from the first declerating belt walkway onto the second decelerating belt walkway which is preferably propelled at a speed of 1½ miles per hour. A second idler pulley 43 of the first decelerating belt walkway 39 engages the return run and holds the belt out of engagement with the second decelerating belt walkway 40.

The second decelerating belt walkway 40 has an idler pulley 44 located beneath the idler pulley 42 of the first decelerating belt walkway 39 and a drive pulley 48 located closely adjacent the stationary platform 4 at the exit end of the movable walkway 2. The second decelerating belt walkway 40 may have a grooved belt surface for engaging a comb edge of the stationary platform 4 at the exit end of the walkway 2 so that passengers can make the transition from the belt walkway to the stationary platform without being caught between the belt and the stationary platform.

It will be understood that the first accelerating belt walkway 28, the second accelerating belt walkway 29, the high speed belt 6 and the auxiliary driving belt 8 as well as the first decelerating belt walkway 39 and second decelerating belt walkway 40 may be supported by auxiliary rollers or plates between the pulleys and idler pulleys over which the belts extend. The belts of the first accelerating belt walkway 28, second accelerating belt walkway 29, the high speed belt 6 and the first decelerating belt walkway 39 are relatively thin which permits them to be driven around the idler pulleys 31, 37, 9 and 42 which have relatively small diameters. The auxiliary driving belt 8, on the other hand, is not required to pass over pulleys of such small radii and therefore may be of a greater thickness which is desirable because this belt carries the greatest load and extends over the greatest distance in the walkway 2. It will be noted that only the second decelerating belt walkway 40 is grooved to mesh with the combed edge of the stationary platform 4 and accordingly it may be thicker than the other belts supporting the passengers since it is not required that this belt pass over pulleys of such small diameters.

With reference to FIGS. 6 and 7, the first accelerating belt walkway 28 is shown in more detail and it will be seen that the idler pulley 31 is mounted on a shaft 49 extending through the ends of arms 50 and 51 of a supporting frame 52 which is secured to the structure of the conveyor system 1 by rods 53 extending transversely across the walkway 28 between the belt thereof. This cantilever construction permits the extension of the walkway 28 over the end of the second accelerating belt walkway 29 to provide the step from one to the other.

It will be seen from FIG. 2 that the second accelerating belt walkway 29 has a supporting frame 57 and the first decelerating belt walkway 39 has a supporting frame 54 which are mounted on the structure of the conveyor system 1 in the same manner as the supporting frame 52 for the first accelerating belt walkway 28.

At either side of the movable walkway 2 are balustrades 55 and 56 extending the length of the walkway. Since the construction of both the balustrades 55 and 56 are the same with the exception that one is left-hand and the other is right-hand, the following description will be confined to only one of the balustrades 55. Referring to FIGS. 1, 3, 6 and 7, vertical pulleys 60 and 61 are mounted within the balustrade 55 and a movable belt sidewall 62 extends along the inner and outer walls of the balustrade and around the vertical pulleys 60 and 61. One of the vertical pulleys 60 and 61 may be a driven pulley for propelling the belt sidewall 62 at a desired speed which in this embodiment is the same speed as the high speed belt 6 or 4½ miles per hour. The movable belt sidewall 62 may have a grooved surface, as shown in FIG. 5, for meshing engagement with a combed edge of a stationary balustrade wall 63 at the exit end of the conveyor system 1. Lower edge 64 of the belt sidewall 62 may be seated in a groove 65 in the edge of the high speed belt 6. If desired, this may be a driving engagement connection whereby the high speed belt 6 will drive the belt sidewall 62 and in this case, the vertical pulleys 60 and 61 would not have to be driven.

The movable belt sidewall 62 is preferably of resilient rubber or other flexible material so that it may be driven around the pulleys 60 and 61; however, reinforcing members extending vertically of the sidewall belt such as metal strips 66, are embedded in the sidewall 62 to provide a relatively rigid wall along the edge of the walkway 2.

As shown in FIG. 5, additional stability to the sidewall 62 is provided by supporting rollers 67 mounted on stub shafts of a vertical structural member 68 of the balustrade 55 for engagement with a rib 69 along the concealed face of the belt sidewall 62. The movable belt sidewall 62 extends from the acceleration zone into the deceleration zone; however, the length may be varied depending on the speed of the high speed belt 6 and of the accelerating and decelerating belts.

The balustrades 55 and 56 have spacing members such as handles 73, which extend over the walkway 2 in the area of the high speed zone and are propelled at the same speed as the high speed belt 6 for supporting the passengers and also restricting their movement along the walkway to prevent overcrowding in the deceleration zone. Since the handle mechanism at the entrance end and the exit end is the same except that the handles 73 which are exposed to the passengers are decelerating and being retracted at the exit end whereas they are being extended and accelerated at the entrance end, the following description will be confined to the entrance end of the balustrade 55.

Referring now more specifically to FIGS. 3, 4 and 5, each of the handles 73 is in a form of a bent arm having an elbow portion 74 pivotally mounted on a U-shaped bracket or saddle member 75 which, as shown in FIG. 5, is seated on top edge 76 of the sidewall 62. The movable belt sidewall 62 thereby provides the driving force for moving the handles 73 and accordingly in the high speed zone, the handles are propelled at the same speed as the sidewall which is travelling at the same speed as the high speed belt 6.

Within the balustrade 55 are parallel saddle lifting bars 77 and 78 mounted on the structural member 68 of the balustrade 55. Guide rollers 79 are rotatably connected to the saddle members 75 by stub shafts 83 and have grooved edges 84 in rolling engagement with the lifting rods 77 and 78. In the high speed zone and in part of the acceleration zone and deceleration zone, the lifting rods 77 and 78 are positioned to hold the saddle member 75 down on the top edge 76 of the belt sidewall 62. At the entrance end and exit end of the conveyor system 1, the lifting rods 77 and 78 are raised an amount sufficient to lift the saddle members 75 over the top edge 76 of the belt sidewall 62 which raises the handles 73 in the entrance area and exit area as shown in FIG. 2.

Each of the bent arm handles 73 has an inner end 85 which also carries a guide roller 86 having grooved edges 87 in guiding engagement with parallel retracting rods 88 and 89 mounted on the balustrade structure. In the high speed zone and in portions of the acceleration zone and deceleration zone, the retracting rods 88 and 89 are closely adjacent the path of the saddle members 75 and thereby hold distal ends 93 of the handles 73 in a position where they extend transversely of the walkway 2 and over the high speed belt 6. At the entrance end of the conveyor system, the retracting rods 88 and 89 are spaced the greatest distance from the path of the saddle members 75 and at this position the distal ends 93 are retracted from the space over the walkway 2. The amount of retraction depends upon the position of the retracting rods 88 and 89 and their relation to the position to the lifting rods 77 and 78 which determine the path of the saddle members 75.

As shown in FIGS. 3 and 4, the handles 73 are completely retracted at the entrance end of the balustrade adjacent the stationary platform 3 and are gradually extended over the first accelerating belt walkway 28 reaching a fully extended position over the second accelerating walkway 29. An entrance trim member or stationary sidewall 94 covers the mechanism described and has a slot 95 through which the distal ends 93 of the handles 73 extend. This stationary sidewall 94 extends up and over the top of the balustrade 55 in a deck providing a totally enclosed mechanism for the protection of the passengers.

The handles 73 are propelled by engagement of the saddle members 75 with the top edge 76 of the moving belt sidewall 62. At the entrance and exit ends of the balustrade 55, the saddle members 75 are lifted from the movable belt sidewall 62; however, the movement of the handles is continued by the action of connecting links 96 pivotally connecting the elbow portion 74 of each handle 73 with the inner end 85 of the next adjacent handle. The connecting links 96 provide the desired spacing between the distal ends 93 of the handles 73 in the high speed zone. This spacing in the embodiment shown is sufficient to accommodate one passenger between the handles 73 of the balustrade 55 and the spacing between the distal ends 93 of the handles 73 extending out of balustrades 55 and 56 across the walkway 2 is sufficient to prevent injury to passengers' arms or hands but is not wide enough to permit easy movement of the passengers along the walkway and thereby crowding at the deceleration zone is prevented.

In the entrance end of the balustrade 55, the connecting links 96 draw the handles 73 closer together in conjunction with the movement of the inner ends 85 away from the path of the elbow portions 74. This spacing of the handles 73 also affects the velocity at which they are moved along the walkway 2 and, as shown in FIG. 3, the spacing and velocity of the handles 73 increases from the entrance end to the end of the first accelerating walkway 28. The speed of the handles at the entrance where the passengers step from the stationary platform 3 onto the first accelerating belt walkway 28 is very slow and then accelerates gradually to the speed of the high speed walkway belt 6 at the second accelerating belt walkway 29. Passengers stepping into the acceleration zone and grasping the handles 73 will be led at a gradually increasing speed causing them to walk along the first accelerating belt walkway 28 and second accelerating belt walkway 29 which insures that they will step from one to the other and then to the high speed belt 6. At the deceleration zone, passengers grasping the handles 73 will also be walking for a similar reason and will therefore step from the high speed belt 6 to the first decelerating walkway 39 and then to the second decelerating belt walkway 40 and finally to the stationary platform 4 at the exit end.

A modified movable walkway system is shown in FIGS. 8, 9 and 10 in which a loading and unloading zone is located between the deceleration and acceleration zones, leading from a first high speed zone 97 to a second high speed zone 98. In the first high speed zone 97, movable belt sidewalls 99 and 100 extend around vertical pulleys 102 and 103 and over a high speed belt 104 extending around the pulley 105 at the beginning of the deceleration zone. At the end of the acceleration zone, movable belt sidewalls 109 and 110 extend around vertical pulleys 111 and 112 and along the sides of high speed belt 113 which extends around horizontal pulley 114 adjacent the end of the acceleration zone.

As shown more clearly in FIG. 10, the movable belt sidewalls 109 and 110 may have handrail flanges 115 and 116 at the upper edges which extend outwardly from the high speed belt 104 and have downwardly extending ribs 119 and 120 providing grooves between the ribs and the outer walls of the sidewalls 109 and 110 for receiving guide rollers 121 and 122 mounted on brackets 123 and 124 secured to the balustrade structure. The high speed belt 113 may have grooves 125 and 126 for receiving the lower edges of the movable belt sidewalls 109 and 110. The supporting apparatus for the high speed belt 104 and the belt sidewalls 99 and 100 at the deceleration zone is the same as that described for the high speed belt 113 and the movable sidewalls 109 and 110 except that the vertical pulleys 102 and 103 are in the deceleration zone.

In this modification, the acceleration and deceleration is provided by a series of wheels 127 driven at progressively decreasing or increasing speeds along the length of the walkway in the deceleration and acceleration zones. These wheels 127 are mounted on parallel transversely extending shafts 128 having pulleys 129 driven by belts 130 extending around pulleys 131 of speed reducers 132 which are connected to a suitable power source, not shown. The wheels 127 on the shafts 128 next adjacnet the high speed belt 104 in the deceleration zone are rotated at a speed approximately the same as the speed of the high speed belt. The wheels 127 mounted on shafts 128 directly adjacent low speed belt 133 in the loading and unloading zone are rotated at a speed approximately the same as the low speed belt. The wheels 127 on the shafts 128 between the two ends of the deceleration zone are rotated at progressively slower speeds by the speed reducers 132.

Passenger carrying platforms 134 are carried by the high speed belt 104 and moved onto the deceleration zone in engagement with the wheels 127 which slow down the platforms to the speed of the low speed belt 133. Similarly, the wheels 127 mounted on shafts 128 in the acceleration zone receive the passenger carrying platforms 134 from the loading and unloading zone where they are progressively moved at a higher rate of speed and conveyed to the high speed belt 113 at a speed approximating the speed of the high speed belt.

The wheels 127 of adjacent shafts 128 in the acceleration zone and deceleration zone are driven at different speeds by the speed reducers 132; however, a passenger carrying platform 134 passing over these wheels will simultaneously engage wheels of several adjacent shafts 128. This causes the wheels 127 which are turned at a speed less than the speed of the platform 134 to slip and causes the wheels 127 turning at a speed greater than the speed of the platform also to slip. In the present embodiment, the belts 130 are of a resilient rubberlike material and stretchable under these conditions. With the stretchable belts 130, there will be little or no slippage of the wheels 127 on the bottom surfaces of the platforms 134 because the belts will stretch to accommodate the differences in driving speeds of the adjacent shafts 128. This action will also tend to reduce the power necessary to drive the platforms 134 because there will be less power lost in the slippage and more power stored in the belts for moving the platforms.

As shown in FIGS. 9 and 10, the platforms 134 have spacing members such as handrails 135 and 136 at the forward and rear edges with vertical panels 137 and 138 at the forward and rear edges to prevent the passengers on the platforms from stepping into the spaces between the platforms. As shown in FIG. 10, the movable sidewalls 109 and 110 serve to retain the passengers on the platforms 134 at the sides and provide the handrail falnges 115 and 116 in the event the passengers wish to grasp these flanges. All of the passenger contacting surfaces are driven at the same speed in the high speed zones 97 and 98. The belt sidewalls 99 and 100 may have grooved surfaces for engaging comb-shaped edges 139 and 140 of the stationary balustrade walls 141 and 142 extending along the deceleration zone to the loading and unloading zone.

The low speed belt 133 extends over end pulleys 143 and 144 of which one may be a driving pulley and may be supported by rollers 145 at the upper run and at the lower run. The low speed belt 133 is wide enough so that the passenger carrying platforms 134 may be carried down the middle and the passengers may disembark and step onto side portions 146 and 147 from which they can walk onto a stationary platform 148 which may have comb edges 149 and 150 for engaging the grooved face of the side portions 146 and 147. Passengers wishing to board the platforms 134 may enter from stationary loading surfaces 151 and 152 and walk over the side portions 146 and 147 to the platforms 134 where they may step on the passenger carrying surfaces of the platforms.

At the downstream end of the loading and unloading zone, it is important that the passengers either step on the platform 134 or do not board at all. Sloped passenger guiding walls 153 and 154 which have flat comb edges 155 and 156 for engaging the grooved face of the side portions 146 and 147 of the low speed belt 133 are gradually tilted as they extend towards the acceleration zone and reach a vertical position where they are joined with stationary balustrade walls 157 and 158 in the acceleration zone. A cantilever construction may be employed to support these walls 157 and 158 or, if desired, rollers may be provided under the walls for rolling on the low speed belt 133. In any case, passengers wishing to board the platforms 134 and reaching comb edges 155 and 156 will be carried up onto the sloped walls 153 and 154 and the slope of these walls will cause the passengers to move towards the platforms and to step onto the platforms before they reach an obstruction at the end of the loading and unloading zone.

In FIGS. 8, 9 and 10, the passenger carrying platforms 134 are carried on high speed belts 104 and 113 from an acceleration zone to a deceleration zone. In FIG. 11, a modification is shown in which the passenger carrying platform 134' has supporting wheels 159 and 160 for rolling engagement with rails such as channels 164 and 165 in the high speed zone. The base of the platform 134' is recessed to receive the wheels 159 and 160 but is provided with flat surfaces 166 at the center and edges for engagement with wheels 127' and low speed belt 133'. In this embodiment, the belt sidewalls 109' and 110' are driven by suitable drive pulleys and are held against the edges 167 and 168 of the platform 134' by traction rollers 169 and 170 mounted on the balustrade supporting structure. Supporting rollers 171 and 172 rotating on stub shafts 173 and 174 about axes transverse of the conveyor and mounted on the balustrade structure engage the surfaces under the handrail flanges 115' and 116' in the grooves between the ribs 119' and 120' and the sidewalls 109' and 110'. With this construction, the high speed supporting and conveying belt is eliminated in the high speed zone and the sidewalls 109' and 110' not only retain the passengers on the platform 134' but also provide the driving force for moving the platform in the high speed zone. Handrails 136' and 135' as well as the panels 137' and 138' are also provided on the platforms 134' to support the passengers and maintain their positions on the platform. In the loading and unloading zones, the passengers simply step down from the platform 134' or step onto the platform in the unloading and loading operation.

A further modification of the invention is shown in FIGS. 12, 13 and 14 wherein a passenger carrying platform 134" has handrails 135" and 136" with panels 137" and 138". At the sides of the platform 134", arms 175 and 176 are swingably mounted on the supports for the forward panel 137" and handrail 135" with the axis about which the arms swing being tilted so that the arms will swing outward and away from the platform in the unloading and loading zone. Extending downwardly and hanging from the arms 175 and 176 are flexible walls such as heavy fabric guards 177 and 178 which may be of canvas or of a suitable plastic. The inner lower corners 179 and 180 may also be fastened to the supports for panel 137". Referring to FIGS. 12 and 13, it will be seen that as the passenger carrying platforms 134" are moved toward the acceleration zone between the guiding walls 153 and 154, the fabric guards 177 and 178 will slide along the walls tending to pull the arms 175 and 176 inward as shown by the arrows in FIG. 14. Finally, the arms 175 and 176 will touch the walls 153 and 154 and be pushed into the closed position which is finally reached when the platforms 134 enter the acceleration zone and the arms and the fabric guards 177 and 178 close the sides of the platforms 134" and move with the platform separating the passengers thereon from the stationary balustrade walls 157 and 158. With this construction, the fabric guards 177 and 178 move with the passengers and prevent them from contacting the stationary balustrade walls in the acceleration zone and also do this in the high speed zone and the deceleration zone. When the passenger carrying platforms 134" reach the loading and unloading zones, the arms 175 and 176 automatically swing outward carrying with them the fabric guards 177 and 178 and permit unrestricted loading and unloading of the platforms.

Now referring further to FIGS. 15 through 20, a further modification is shown in which a high speed belt 181 has hinged sidewalls 182 and 183 as shown more clearly in FIGS. 17, 19 and 20. The sidewalls 182 and 183 are in the vertical position in the high speed zone and are folded down in the deceleration zone for movement over and around an idler pulley 186 for return of the belt in the lower run 187 in a flat condition. Guide rollers 188 engage the edges 189 of the hinged sidewalls 182 and 183 during the movement of the sidewalls from the vertical to the horizontal position as shown in FIG. 17. These guide rollers 188 are mounted on the balustrade structure in suitable location. The high speed belt 181 may also be supported on rollers 190 mounted on balustrade supporting members 194.

Passenger carrying platforms 195 are carried by the high speed belt 181 between the hinged sidewalls 182 and 183 in the high speed section and have handrails 196 and 197 mounted on supports at the forward and rearward ends of the platforms with panels 198 and 199 also mounted on the supports and under the handrails to prevent the passengers from stepping between the platforms. The platforms 195 have side plates 200 and 201 extending downwardly from the passenger carrying surface at each side for bridging a deceleration assembly 205. Guide rollers 206 are mounted between step flanges 207 and brackets 208 on the side plates 200 and 201 to center the platforms 195 as they pass along the deceleration zone. These guide rollers 206 may engage stationary sidewalls 209 and 210.

The deceleration assembly 205 has a frame 211 with side members 215 and 216 and end members 217. A series of parallel lower shafts 218 are mounted in bearings between the side members 215 and 216 and have wheels 219 for engagement with the surface of the high speed belt 181. A series of upper shafts 220 are mounted in parallel relationship in bearings between the side members 215 and 216 and have wheels 221 which are engageable with the underside of the passenger supporting surface of the platforms 195. Each of the wheels 219 on the lower shafts 218 has a lower cam 222 with a cylindrical surface for engagement with an upper cam 223 having a cylindrical surface mounted on one of the wheels 221 on the upper shafts 220. As shown more clearly in FIGS. 18 and 20, the diameters of the upper cam 223 and lower cam 222 at the positions along the deceleration zone are progressively changed to provide for driving the platforms 195 at a progressively slower speed.

As shown in FIG. 18, the diameter D1 of the lower cam 222 is the same as the diameter of the upper cam 223 and therefore the speed of the platforms 195 (V1) is the same as the speed (V1) of the high speed belt 181. This would be the condition of the first pair of shafts 218 and 220 receiving the platforms 195 from the high speed zone. Referring again to FIG. 18, the diameter (D2) of the lower cam 222 is smaller than the diameter of the upper cam 223 and therefore the driven velocity of the platform 195 (V2) will be less than the velocity (V1) of the high speed belt 181. This would be the condition of a pair of shafts 218 and 220 intermediate the ends of the frame 211. Referring again to FIG. 18, the diameter of the lower cam 222 (D3) is much smaller than the diameter of the upper cam 223 providing a much slower driven velocity (V3 min) of the platform 195. These cams represent the condition of the shafts 218 and 220 closest to the loading and unloading zone. As the lower wheels 219 are rotated by engagement with the high speed belt 181, they rotate the lower cams 222 which are in engagement with the upper cams 223 and thereby rotate the upper wheels 221 and drive the platforms 195 through the deceleration zone. The cam diameters of the lower cams 222 are decreased progressively and the cam diameters of the upper cams 223 are increased progressively which progressively decreases the driving speed and rotation of the wheels 221 in engagement with the platforms 195 and thereby provides the deceleration necessary for smoothly moving the platforms 195 onto the low speed belt 133'''. This low speed belt 133''' extends around an idler pulley 143''' which carries the platforms 195 to an acceleration zone, not shown. The passengers may step on and off the platforms 195 in the unloading and loading zone and may use the step flanges 207 if desired.

The same principle can be utilized in the acceleration zone with the diameters of the cams 222 and 223 reversed to progressively increase the speed of the platforms 195 engaged by the upper wheels 221. The frame 211 is supported on the wheels 219 and is held from movement along the high speed belt by a structural member 224 mounted on the end member 217 and secured to the supporting structure of the conveyor system.

From the foregoing, it can now be seen that the conveyor system of the present invention effectively provides for conveying passengers at high speeds while at the same time protecting them from contact with slow moving objects or stationary objects such as the balustrade trim. In addition, the acceleration and deceleration of the passengers is provided with a minimum of equipment and in a manner which is safe and requires a minimum of maintenance.

While certain representative embodiments and details have been shown for the purpose of illustrating the invention, it will be apparent to those skilled in the art that various changes and modifications may be made therein without departing from the spirit or scope of the invention.

I, therefore, particularly point out and distinctly claim as my invention:

1. A passenger conveying system comprising a movable support for carrying passengers from one place to another along a fixed path at a predetermined speed, an endless vertical retaining belt extending upwardly from said movable support and along the edge of said fixed path, a plurality of spacing members disposed over said fixed path at spaced-apart longitudinal positions along said path with means for moving said spacing members along said path at the same speed as said movable support whereby the passengers carried are distributed evenly along said path for orderly transfer at the exit end, said vertical retaining belt having a lower edge and an upper edge and said spacing members being in driven engagement with said upper edge along said fixed path.

2. A passenger conveying system according to claim 1 wherein said spacing members are handles which are extended over said fixed path at the entrance end of the system and are removed from over said path at the exit end of said system to support and control passengers riding on said conveyor.

3. A passenger conveying system according to claim 1 wherein said handles are rotatable about pivotal members having vertical axes and are connected to link means for swinging said handles towards and away from said fixed path, said link means being actuated by cam means at the exit and entrance ends of said conveyor system.

4. A passenger conveying system according to claim 3 wherein portions of said cam means are disposed in positions relative to the path of said pivotal members to provide for changing the distances between said pivotal members at the exit and entrance ends of said conveyor system whereby said handles are accelerated and decelerated at the ends of said conveyor system.

5. A passenger conveying system according to claim 4 wherein said cam means is a rail spaced from the edge of said fixed path and connected to said handles by a cam roller on said link means.

6. A passenger conveying system according to claim 5 wherein stationary walls are disposed at the exit and entrance ends of said conveyors abutting said retaining member and said pivotal member is supported by said stationary walls at the exit and entrance ends of said conveyor system.

7. A passenger conveying system comprising a movable support for carrying passengers from one place to another along a fixed path at a predetermined speed, a passenger retaining member extending vertically upward from said movable support and along the edge of said fixed path and means for moving said retaining member at the same speed as the movable support wherein said movable support is a movable platform being carried by a movable landing belt at the entrance end of said fixed path and a stationary wall is disposed at the edge of said entrance end of said fixed path extending along the edge of the entrance path of said movable platform carried on said landing belt, said wall sloping away from said entrance end at a progressively increasing angle from the vertical to the horizontal position as the distance from the entrance end of said fixed path increases whereby a passenger is urged onto said movable platform from said landing belt by said wall.

8. A passenger conveying system according to claim 7 wherein said retaining member is a vertical endless retaining belt and abuts a vertical wall portion of said stationary wall for retaining a passenger on said platform after transfer of said movable platform onto said fixed path.

9. A passenger conveying system comprising an endless supporting belt supporting a movable platform for carrying passengers from one place to another along a fixed path at a predetermined speed, a passenger retaining member extending vertically upward from said supporting belt and along the edge of said fixed path, acceleration and deceleration mechanisms disposed over the ends of said support belt at the entrance end and exit end of said fixed path, each of said mechanisms comprising a set of driving rollers engaging said supporting belt for rotation at the same speed of said supporting belt and a set of driven rollers in engagement with said set of driving rollers for supporting and changing the speed of said movable platform, the radii of the engaging surfaces of said driven rollers and said driving rollers being progressively different from one end of said mechanism to the other for changing the speed of rotation of said driven rollers for accelerating and decelerating the speed of said movable platform.

10. A passenger conveying system according to claim 9 wherein said mechanisms are mounted in stationary positions to prevent movement along said supporting belt and are supported on said set of driving rollers on said supporting belt and said movable platform having supporting members extending downwardly from said platform at the edges a distance less than the thickness of said mechanisms whereby said platform may be supported by said driven rollers engaging the platform or by said supporting members on said supporting belt.

11. A passenger conveying system comprising a movable platform for carrying passengers from one place to another along a fixed path at a predetermined speed, a swinging closure on said platform extending outward during loading and unloading and swinging into a retaining position along the edge of said fixed path at other times and said swinging closure having an elongated support pivoted about the forward edge of said platform and supporting a wall of flexible material hanging from said support whereby said wall provides protection of the passengers from engagement with the balustrade along the edges but does not exert appreciable forces against the passengers using said movable platform.

12. A passenger conveying system according to claim 11 wherein said swinging closure in the outwardly extending position is engageable by a stationary surface at the entrance end edge of said fixed path, said surface sloping away from the entrance end at an increasing angle as the distance from the entrance end increases whereby said closure is biased inwardly as said platform enters said fixed path to enclose the edge of said platform.

13. A passenger conveying system comprising an endless supporting belt for carrying passengers from one place to another along a fixed path at a predetermined speed, a passenger retaining belt hingedly connected to the supporting belt at the edge of the supporting belt and extending vertically upward and along the edge of said fixed path, said retaining belt having grooves and ribs extending longitudinally thereof for engagement with a comb at the end of said fixed path and means for moving said retaining belt at the same speed as said supporting belt.

14. A passenger conveying system comprising a movable platform having rollers disposed in supporting engagement with rails extending longitudinally of the conveying system along a fixed path for carrying passengers from one place to another along said path at a predetermined speed, an endless vertical retaining belt extending along the edge of said path trained around vertical pulleys at each end of said path in driving engagement with said movable platform, said movable platform having supporting members extending downwardly from said platform at the edges below said rollers and said rails being raised whereby said platform may be supported on a surface under said supporting members at the ends of said path when said rollers are not supported on said rails.

15. A passenger conveying system comprising a movable support for carrying passengers from one place to another along a fixed path at a predetermined speed, an endless vertical passenger retaining belt extending upwardly from said movable support and along the edge of said fixed path, a deceleration conveyor disposed at the exit end of said fixed path further comprising a belt type conveyor moving in the same direction as said movable support and at a slower speed than said predetermined speed, said movable support extending over said belt type conveyor whereby passengers may step on to said belt type conveyor traveling at said slower speed from said movable support and then step off said belt type conveyor, said retaining belt extending alongside said deceleration conveyor to abut a stationary wall extending along the edge of said belt type conveyor of said deceleration conveyor, and said retaining belt having grooves and ribs extending longitudinally thereof for engagement with a comb structure mounted on said stationary wall and having teeth intermeshing with the grooves of said belt.

16. A passenger conveying system comprising a movable support for carrying passengers from one place to another along a fixed path at a predetermined speed, a passenger retaining member mounted for support independently of said movable support extending vertically upward from said movable support and along the edge of said fixed path, a plurality of spacing members disposed over said fixed path and said support and spaced-apart at longitudinal positions along said path and support in an obstructing position to deter movement of passengers along said path and support, said spacing members being located at positions for grasping by the passengers, said spacing members being connected to said retaining member for movement of said spacing members along said path at the same speed as said movable support whereby the passengers carried on said movable support are distributed evenly along said path for orderly transfer at the exit end of said path.

17. A passenger conveying system according to claim 16 wherein said spacing members comprise handles extending over said path a distance sufficient to deter movement of the passengers along said movable support.

18. A passenger conveying system according to claim 16 wherein said movable support further comprises movable platforms and said spacing members include bars mounted at the ends of said movable platforms at positions for grasping by the passengers to retain passengers on said platforms and restrict their movement longitudinally along said path.

19. A passenger conveying system comprising a movable platform for carrying passengers from one place to another along a fixed path at a predetermined speed, a passenger retaining member extending vertically upward from said movable platform and along the edge of said fixed path, said movable platform being carried by acceleration and deceleration rollers at the entrance end and exit end of said fixed path, power means for rotating said rollers at different speeds and connecting means from said power means to said rollers comprising stretchable resilient belts whereby the speed of each of said rollers may be reduced to match the speed of the movable platform engaged and driven by said rollers and means for moving said retaining member at said predetermined speed.

* * * * *